Figure 1:
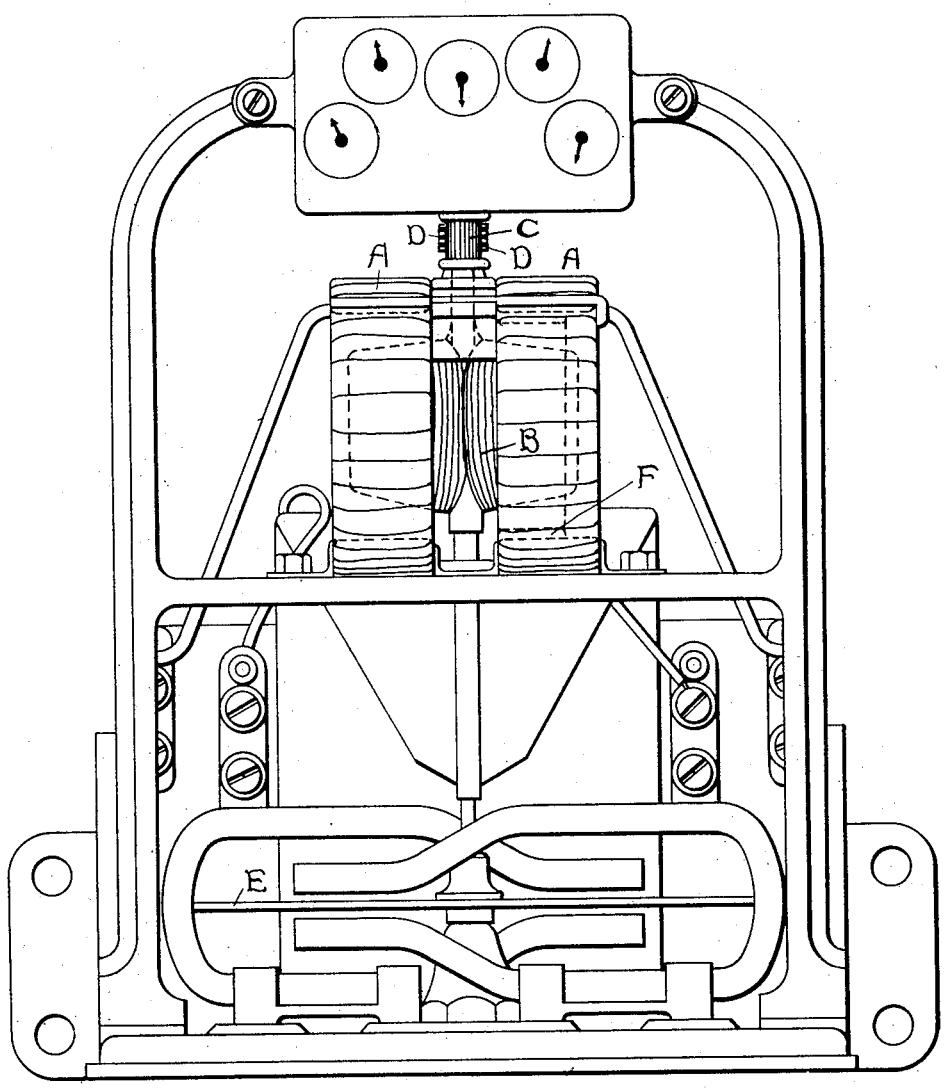

No. 744,077. PATENTED NOV. 17, 1903.
C. H. INGALLS.
COMMUTATOR.
APPLICATION FILED OCT. 3, 1901.
NO MODEL.

Witnesses.
Erving R. Gurney.
Benjamin B. Hull.

Inventor.
Charles H. Ingalls.
by Albert H. Davis
Atty.

No. 744,077.

Patented November 17, 1903.

UNITED STATES PATENT OFFICE.

CHARLES H. INGALLS, OF DANVERS, MASSACHUSETTS, ASSIGNOR TO GENERAL ELECTRIC COMPANY, A CORPORATION OF NEW YORK.

COMMUTATOR.

SPECIFICATION forming part of Letters Patent No. 744,077, dated November 17, 1903.

Application filed October 3, 1901. Serial No. 77,392. (No model.)

*To all whom it may concern:*

Be it known that I, CHARLES H. INGALLS, a citizen of the United States, residing at Danvers, county of Essex, State of Massachusetts, have invented certain new and useful Improvements in Commutators, of which the following is a specification.

This invention relates to a process of treating metal in order to regulate the friction between moving surfaces. It has especial reference to the commutators of electrical apparatus, such as rotating meters. For that reason I have elected to illustrate and describe the invention as applied to a recording-wattmeter of the well-known Thomson type; but it should be kept in mind that the method hereinafter described has in some of its aspects a wide range of application.

Moving surfaces between which frictional contact is maintained are liable to alter with respect to the coefficient of friction as time goes on. In the case of a recording-wattmeter this change in the friction between the commutator and the brushes is a serious matter, since it necessitates frequent readjustment of the starting-coil to properly compensate for this frictional load. An electric-power company is therefore put to considerable expense for the services of the employees required to look after the meters, besides the annoyance of having its customers suspect the accuracy of the meter-readings. It is found, however, that with the lapse of time the necessity for readjusting disappears. The surfaces of the commutator and the brushes seem to reach a condition of stability with a permanent and unchanging degree of friction. At this point of time the light load accuracy has decreased all that it is likely to from commutator causes, so that a motor corrected after this critical point has been reached retains its accuracy so long as the jewel bearing remains good. It is inferred from this that the surfaces of the commutator and brushes undergo some chemical change from gases in the atmosphere, especially corroding gases, such as contain sulfur.

I have discovered that by applying to the surfaces in question a solution of a sulfid or polysulfid the surfaces will be chemically altered by the union of the sulfid and the metal of the surfaces treated and that the surfaces so treated will not thereafter be further changed by the action of the atmosphere. Furthermore, so far as the commutator and brushes enter into the proper running of the meter their condition will remain stable, and the accuracy of the meter, particularly on small loads of five per cent. and over of the rated capacity of the meter, will be very reliable and far greater than with meters in which the commutator and brushes have not been thus treated.

The process which I have invented may be carried out as follows: A saturated solution is made of any soluble sulfid, preferably potassium polysulfid. The vehicle which I prefer is alcohol, and to this I add considerably more commercial "liver of sulfur" than will be dissolved by the quantity taken. This solution is applied to the surface to be treated, such as the commutator and brushes of a meter, by any suitable means, such as a camel's-hair brush, which is preferably only moistened with the solution and held lightly against the commutator while the latter is being rotated. This application of the solution is repeated several times until the commutator shows no further change. The surface of the commutator is then polished with linen tape or the like. The solution can be applied to the meter-brushes either by using the camel's-hair brush or moistening a piece of absorbent material and placing it on the brush or by dipping the meter-brush tips in the solution itself. The brush contact-surfaces are also polished with linen tape. The result of this process is to quickly produce on the surfaces treated a thin coating of the sulfid of the metal of which said surfaces are composed. Copper or silver is generally used for the commutator-bars of recording-meters, so that the coating formed thereon will be a sulfid of one of these metals.

Alcohol or ether is preferred to water as a solvent, because it aids in cleaning the surface to be treated and enables the sulfid to act more efficiently. The coating is not only a protection against the corroding effect of gases in the atmosphere, but it may slightly reduce the conductivity of the commutator, since it is not so good a conductor as the pure metal. This, however, is easily allowed for in the adjustment of the starting-coil, so that a meter thus treated requires no subsequent correction on account of the commutator and brushes. Greater accuracy is thus attained, and all the annoyances of frequent readjustment are obviated.

Figure 2:
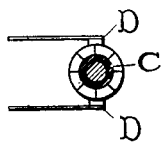

In the accompanying drawings, Figure 1 is a front elevation of a Thomson recording-wattmeter. Fig. 2 is a cross-section of the commutator and brushes.

The meter has the usual field-coils A, rotating armature B, commutator C, brushes D, damping-disk E, and adjustable starting-coil F. The latter, as is well known, is used to compensate for the friction of the rotating parts. When the commutator and brushes have been treated as described above, the starting-coil needs but one adjustment for the load due to their friction, which will remain constant from the beginning of the meter's service.

As previously stated, this process of forming a protection-coating of sulfid on a metal surface exposed to friction is capable of extended application, and I do not limit it to treating meter commutators and brushes.

What I claim as new, and desire to secure by Letters Patent of the United States, is—

1. A commutator for an electric meter treated with a coating of a solution of a soluble sulfid.

2. A meter-commutator having a coating of a sulfid of the metal of which it is made.

3. A meter-commutator having a coating resulting from the action on the metal of which it is made of potassium polysulfid.

In witness whereof I have hereunto set my hand and seal this 24th day of September, 1901.

CHARLES H. INGALLS. [L. S.]

Witnesses:
GEORGE B. SEARS,
JENNIE W. SEARS.